S. T. PARK & J. E. PHILLIPS.
DYNAMOMETER.
APPLICATION FILED FEB. 11, 1908.
946,264.
Patented Jan. 11, 1910.
6 SHEETS—SHEET 3.
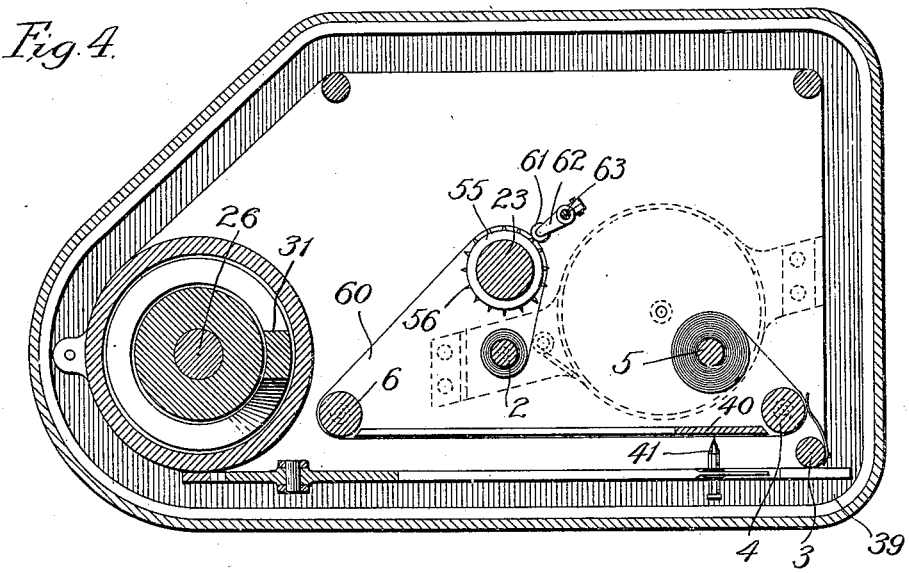
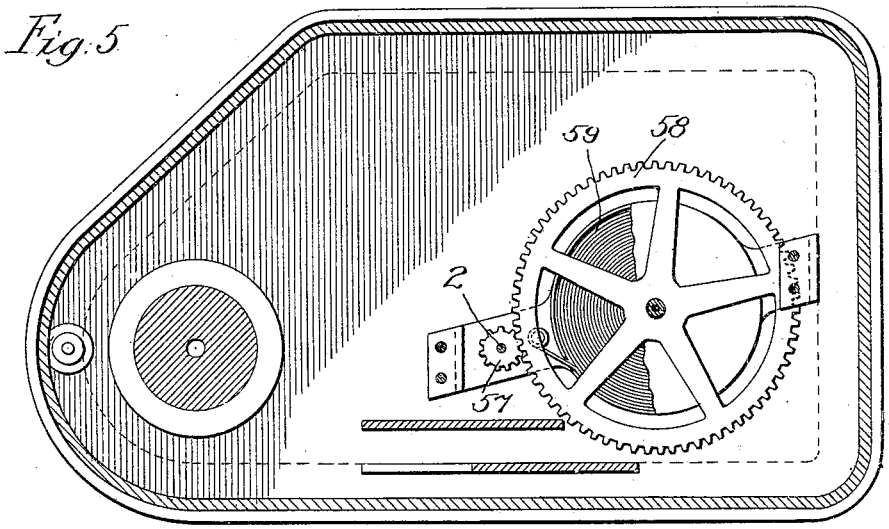

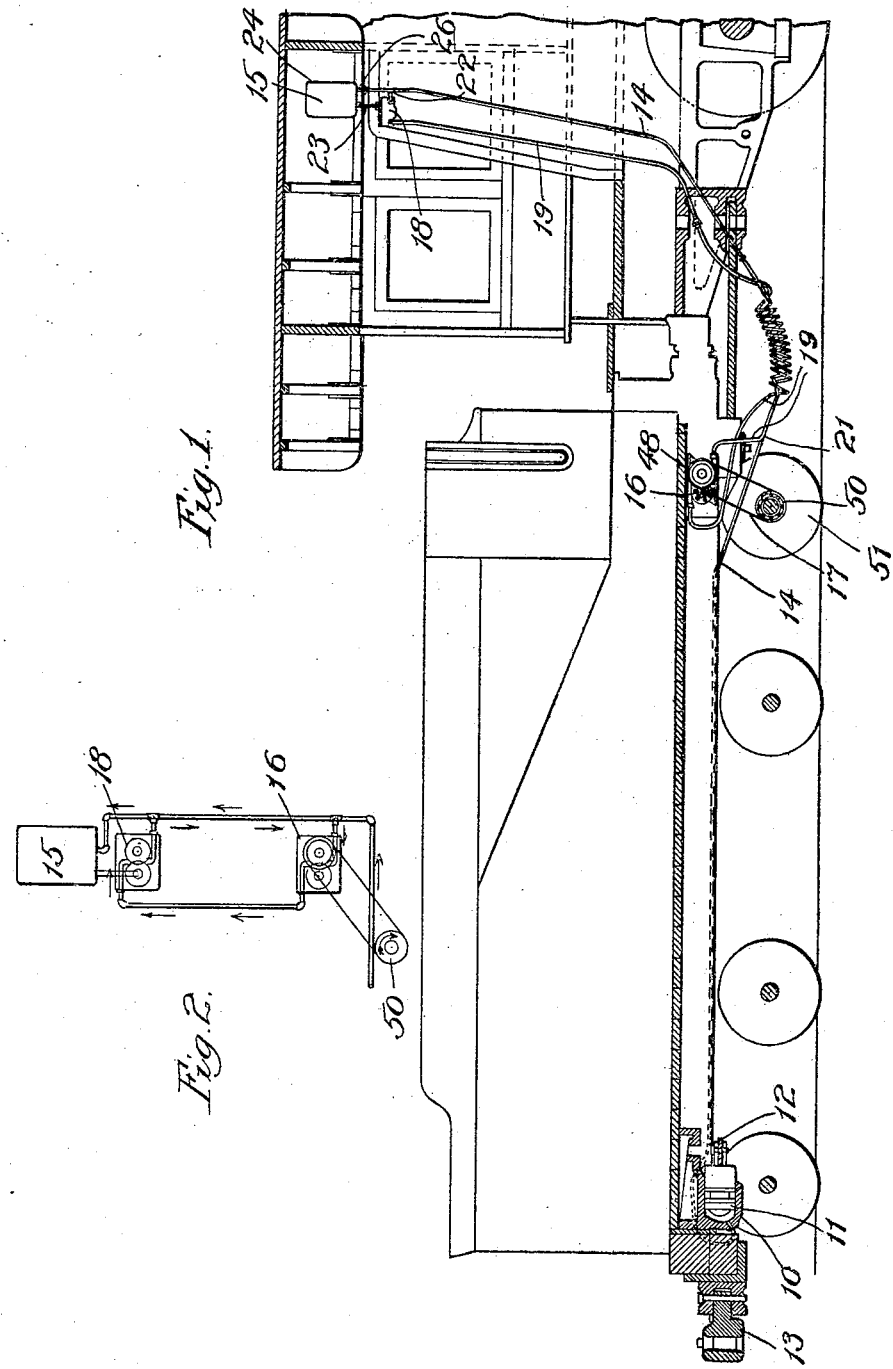

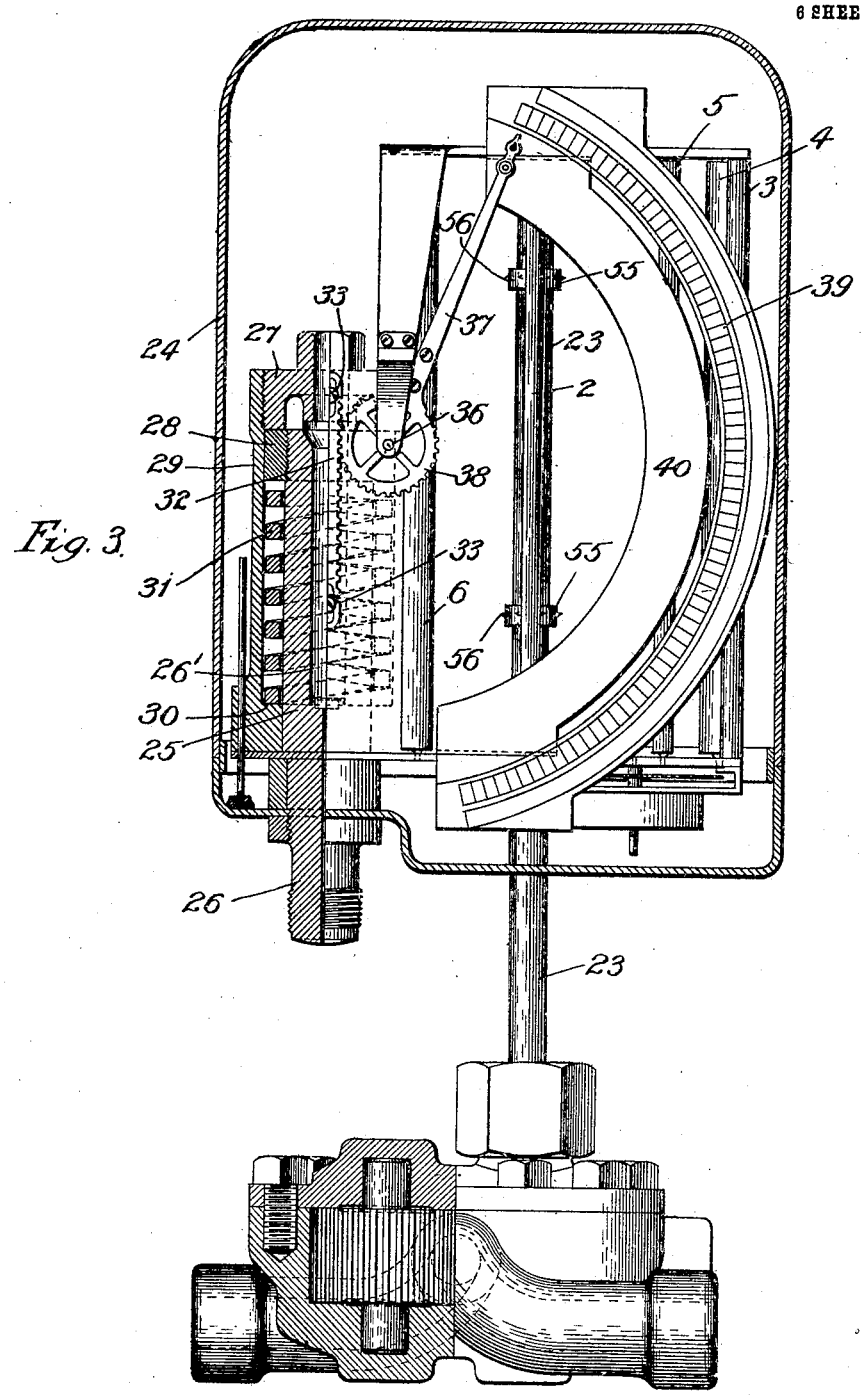

S. T. PARK & J. E. PHILLIPS.
DYNAMOMETER.
APPLICATION FILED FEB. 11, 1908.

946,264.

Patented Jan. 11, 1910.
6 SHEETS—SHEET 4.

Witnesses:

Inventors:
John E. Phillips.
Samuel T. Park.
By Sheridan & Wilkinson
Attys.

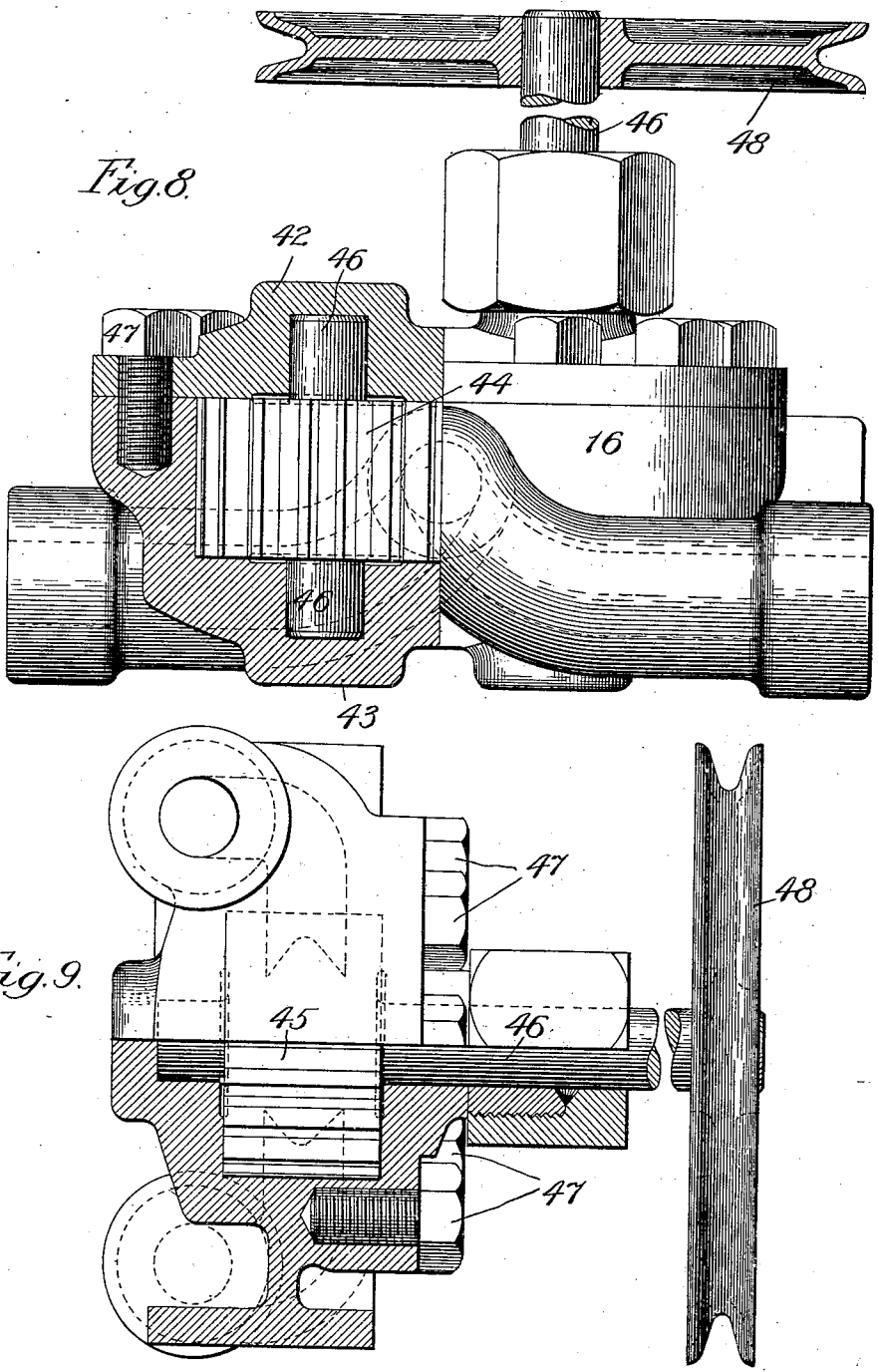

S. T. PARK & J. E. PHILLIPS.
DYNAMOMETER.
APPLICATION FILED FEB. 11, 1908.

946,264.

Patented Jan. 11, 1910.
6 SHEETS—SHEET 6.

Witnesses:
Inventors:
John E. Phillips.
Samuel T. Park.
By Sheridan & Wilkinson
Attys.

UNITED STATES PATENT OFFICE.

SAMUEL THOMAS PARK AND JOHN EMMITT PHILLIPS, OF DANVILLE, ILLINOIS, ASSIGNORS TO LOCOMOTIVE RECORDING DYNAMOMETER COMPANY, OF CHICAGO, ILLINOIS, A CORPORATION OF MAINE.

DYNAMOMETER.

946,264. Specification of Letters Patent. Patented Jan. 11, 1910.

Application filed February 11, 1908. Serial No. 415,377.

*To all whom it may concern:*

Be it known that we, SAMUEL T. PARK and JOHN E. PHILLIPS, citizens of the United States, both residing at Danville, in the county of Vermilion and State of Illinois, have invented certain new and useful Improvements in Dynamometers, of which the following is a specification.

The object of our invention is to provide an improved form of dynamometer to be used for the purpose of measuring draft of steam locomotives or other railway motors, and more especially to provide improved means for actuating the web of paper upon which the force is recorded.

A further object of the invention is to provide means whereby the force exerted by the locomotive may be recorded in connection with a profile and other characteristics of the track traveled over, thus enabling a ready comparison between the draft exerted by the locomotive with the road over which the train is being hauled at any given time.

Figure 6:
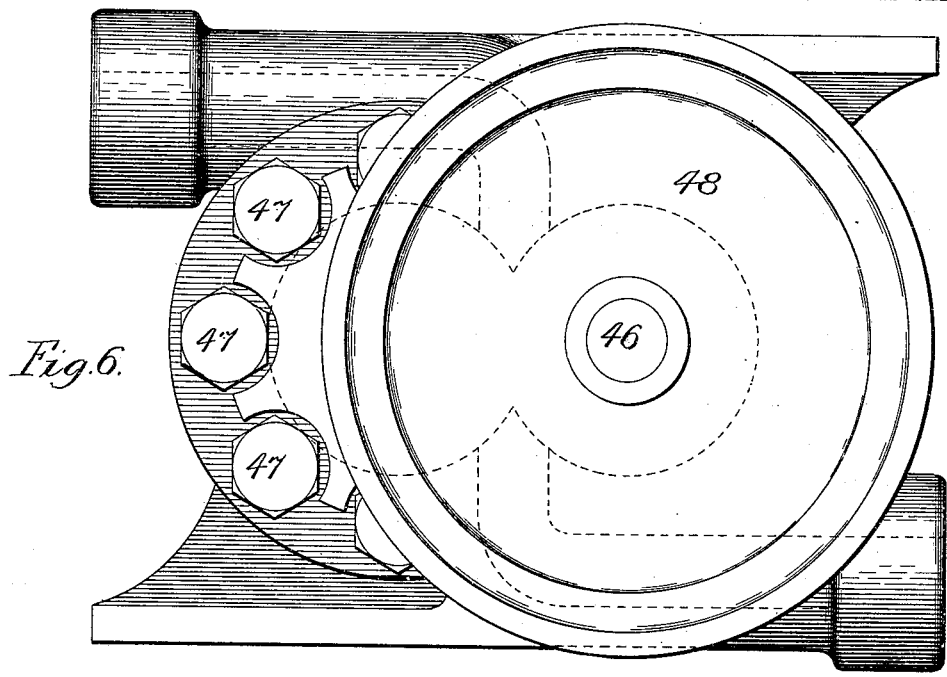
Figure 7:
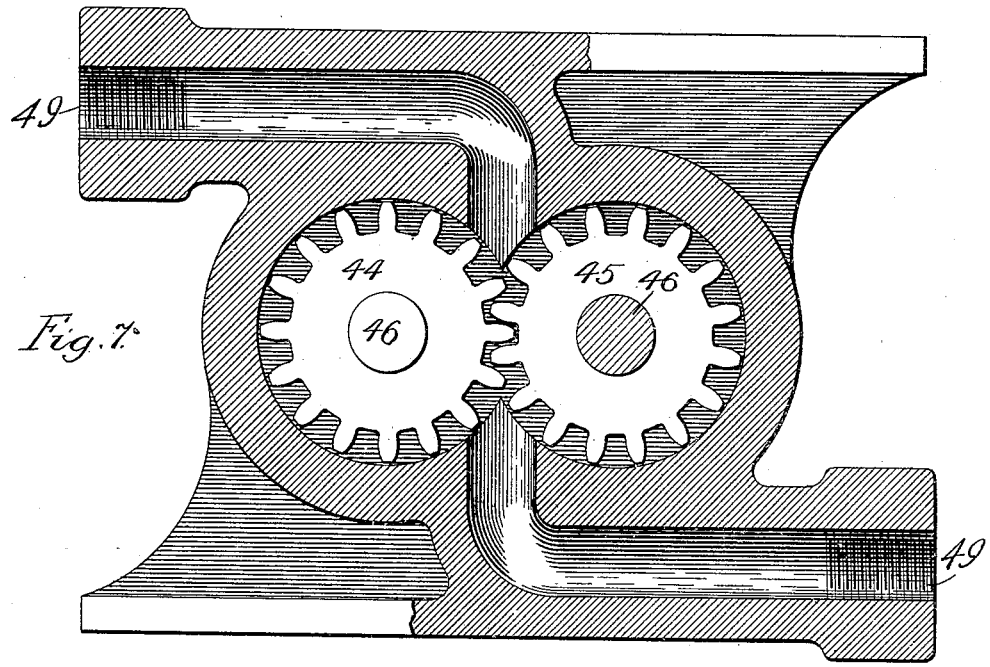
Figure 10:
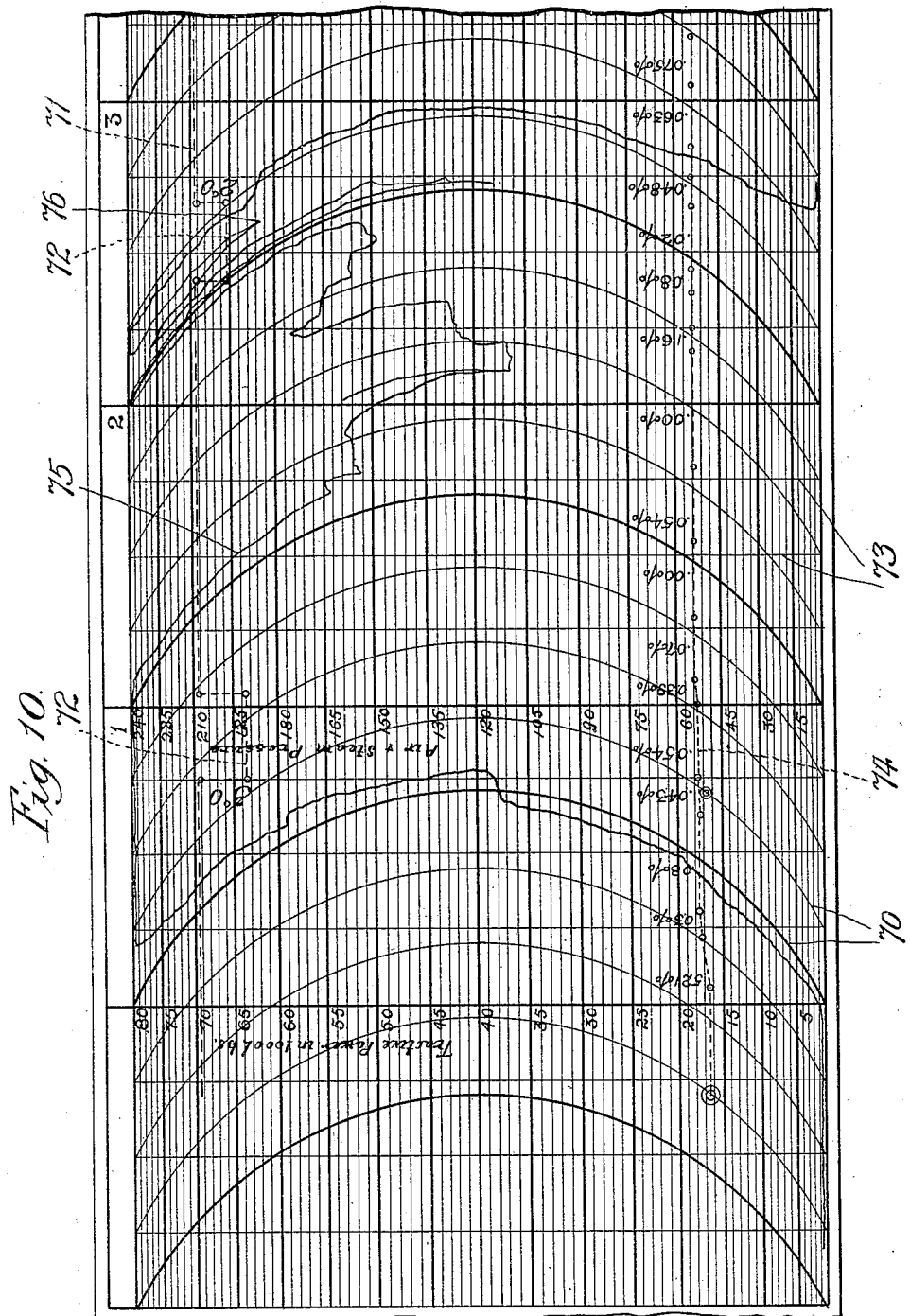

In the drawings—Figure 1 is a side elevation, partly in section, of the rear end of a locomotive and its tender equipped with our invention. Fig. 2 is a diagrammatic view of a pump and motor for actuating the paper, together with the connections between the pump and motor and the remainder of the system. Fig. 3 is a front elevation, partly in section, of the dynamometer proper as mounted in the locomotive cab, together with the hydraulic motor for moving the record sheet. Fig. 4 is a cross sectional view showing the mechanism for moving the record sheet, the section being taken about midway of the dynamometer, as shown in Fig. 3. Fig. 5 is a cross sectional view similar to Fig. 4. the section being taken at a point lower down and just above the gearing for actuating the roll upon which the record sheet is wound up. Fig. 6 is an elevation of the pump. Fig. 7 is a view similar to Fig. 6, but partly in section. Fig. 8 is a plan, partly in section, showing the pump and actuating pulley. Fig. 9 is an end view, partly in section, of the pump and pulley. Fig. 10 is a view of a profile record sheet.

In order to effect the objects for which our invention is designed, it is necessary that the record sheet be actuated at a rate of speed directly proportional to the speed of the train. In our improved apparatus, this result is accomplished by means of a pump and motor acting upon and actuated by liquid contained in a pipe forming a closed circuit, the pump being propelled by means of power derived from some element whose movement is proportional to the speed of the train, preferably, from one of the track wheel axles. The tractive force of the locomotive is transmitted to the train through pressure upon a liquid, such pressure being indicated and recorded through the medium of a suitable dynamometer, and the pump and motor above referred to are preferably located, as illustrated in the drawings, in a pipe which forms a shunt from the pipe connecting the dynamometer with the device wherein the tractive force of the locomotive is imposed upon the liquid.

In the form of our invention illustrated in the drawings, the tractive force of the locomotive is imposed upon liquid contained in a cylinder 10 by means of a plunger 11. We have shown the cylinder 10 secured to the rear end of the tender and the plunger 11 secured to the strap 12, which strap constitutes the draw-bar and is secured to the coupler head 13. The draft is thus measured between the tender and the first car of the train. It is obvious, however, that the apparatus might, if desired, be interposed between the locomotive and tender. The cylinder 11 is connected by a pipe 14 with the dynamometer 15. A pump 16 is preferably mounted upon the forward end of the tender and geared to one of the axles thereof by means of a belt 17 or in any other suitable manner. The dynamometer 15 is mounted in the locomotive cab and directly beneath it is mounted the hydraulic motor 18. The pump 16 and motor 18 are located in a shunt pipe 19 which branches from the pipe 14 at points 21 and 22. The motor 18 actuates the paper feeding mechanism of the dynamometer through the shaft 23.

As illustrated in the drawings, the dynamometer consists of a fixed casing 24 secured to some convenient part of the locomotive cab. Fixed to this casing is a cylinder 25 having a downwardly projecting nipple 26 to which the pipe 14 is secured. Projecting downwardly in the cylinder 25 is a plunger 26', the upper end of which is enlarged, as shown at 27. Threaded upon the top of the cylinder 25 is a collar 28, and a downwardly projecting sleeve 29 is threaded upon the enlarged end 27 of the plunger 26'. The lower end of the sleeve 29 is formed with an inwardly projecting shoulder 30, which shoulder is opposed to and in vertical alinement with the lower face of the collar 28. Interposed between the shoulder 30 and the lower side of the collar 28 is a heavy spring 31. It will be understood that the collar 28 is stationary and that the tension of the spring 31 tends to hold the sleeve 29, together with the plunger 26, which is connected thereto, in their lowermost position, as illustrated in Fig. 3 of the drawings. The pressure exerted upon the liquid contained in the cylinder 10 is transmitted through the pipe 14 to the cylinder 25, thus raising the plunger 26 against the tension of the spring 31, the movement of the plunger 26 being proportional to the tractive force exerted by the locomotive. Secured upon the side of the sleeve 29 is a rack 32. This rack is preferably secured adjustably to the sleeve by means of screws 33 passing through slots in the rack. The remaining parts of the dynamometer are supported upon a frame contained within the casing 24, said frame consisting of upper and lower plates connected by column bolts. Pivoted to a part of this frame at 36 is an indicating and recording finger 37. The pivoted end of the finger 37 takes the form of a spur gear 38 which meshes with the rack 32, whereby the movements of said rack, due to variations in the tractive force of the locomotive, cause the finger 37 to rotate upon its pivot 36. The outer end of the finger 37 coöperates with a graduated segment 39, this segment being calibrated in such manner as to give correct readings in any desired units. Just inside of the indicator segment 39 and lying slightly back thereof is a table 40, also segmental in form. The sheet upon which the record is made is moved across this table by the mechanism hereinafter described and the record thereon is made by means of a marker 41 attached to the index finger 37, as illustrated in Fig. 4 of the drawings.

The pump and motor forming part of the paper feeding mechanism may be any desired construction. In the drawings, we have illustrated the pump and motor as of substantially the same form, the pump 16 being illustrated in detail in Figs. 6 to 9. The casing of the pump consists of plates 42 and 43, properly recessed upon their inner faces to form chambers in which the meshing gears 44 and 45 may rotate. These gears are provided with trunnions 46 seated in bearings formed upon the inner faces of the plates 42 and 43. These plates are secured together by stud bolts 47. Ducts 49 lead from the ends of the casing at the top and bottom, respectively, from the exterior thereof to points opposite the line of contact between the gears 44 and 45, and the shunt pipe 19 is threaded into the outer ends of said ducts 49. One of the trunnions 46 of the gear 45 is extended outwardly through a suitable stuffing box secured to the casing and at its outer end a pulley wheel 48 is secured thereon. Secured upon the adjacent track wheel axle is a split pulley 50 of any desired construction, and a belt 17 passes around the pulleys 48 and 50. By this means the rotation of the track wheel 51 is communicated to the spur gear 45 of the pump 16 and movement is thereby communicated to the co-acting gear 44. The rotation of the gears 44, 45 causes a flow of liquid through the shunt pipe 19 and motor 18. The motor 18 is of the same construction as the pump 16, above described, and the passage of liquid between its co-acting spur gears causes rotation thereof. Secured to one of the spur gears of the motor 18 is the shaft 23 which passes upwardly into the casing of the dynamometer where it is provided with suitable bearings. Inside of the dynamometer casing the shaft 23 is provided with collars 55 from which pointed spurs 56 project.

The roll of paper upon which the record is to be made is mounted upon the shaft 5, as shown in Fig. 4 of the drawings, and a web of paper passes around the guide roll 4 in front of the marking table 40 around the guide roll 6 and shaft 23 to take-up roll 2. The take-up roll 2 is provided at its lower end with a spur gear 57 which meshes with a spur gear 58. The spur gear 58 is impelled by the spring 59 which causes the take-up roll 2 to revolve in the proper direction to wind the paper off from the roll 5. The movement of the paper from the roll 5 to the roll 2, however, is restrained and controlled by the spurs 56 upon the shaft 23. These spurs engage the paper sufficiently to prevent its slipping, thereby limiting the speed of movement of the paper to the speed of movement of the shaft 23. In order to more effectually secure the proper engagement between the sheet of paper 60 and the spurs 56, we provide pressure rolls 61 mounted upon arms 62 which are adjustably secured to a shaft 63. By adjusting the arms 62 at different angles a more or less intimate degree of contact may be secured between the paper 60 and the spurs 56.

In operation, the pressure upon the liquid contained in the cylinder 10 will be transmitted through the pipe 14 to the interior of the cylinder 25, thus causing variations in the position of the plunger 26' and attached rack 32, such variations being controlled by the pressure in the cylinder 10 and the counteracting influence of the spring 31. The movements of the rack 32 will be communicated to the indicating and recording finger 37 through the spur gear 38 secured thereto. The movement of the record sheet beneath the marker 41 will be controlled by and be proportionate to the speed of movement of the train, such movement being caused primarily by the rate of action of the pump 16, which rate of action will be in direct proportion to the speed of rotation of the track wheel 51. The pump 16 will thereby cause a flow of water, oil or whatever liquid is used around the closed circuit illustrated in Fig. 2, such flow being proportional to the speed of movement of the train and thereby propelling the motor 18 at a similar speed. The movement of the motor 18 being communicated to the shaft 23, the latter will, through the engagement of its spurs 56 with the web of paper, permit the latter to move at a predetermined ratio to the movement of the train. This ratio may be adjusted in any desired manner, as by varying the sizes of the pump and motor or by otherwise regulating the flow of liquid through the pipe 19. Such regulation might consist in suitably adjusting the relative sizes of the pulleys 48 and 50.

In connection with our improved dynamometer, as hereinbefore described, we propose to use a record sheet upon which the profile of the track traversed will be indicated by a profile line. By means of such a record sheet we are enabled to obtain a permanent record of the draft of the locomotive, such record being displayed in relation with the profile of the road at each and every point where the record is taken. By moving the record sheet proportionately to the speed of the train, the profile thereon, at the point where the marker is operating, will always represent the precise portion of the road being traversed. If desired, other characteristics of the road, such as curves, crossings, switches, etc., may be indicated upon the record sheet by any suitable symbols.

The record sheet shown in Fig. 10 of the drawings is ruled with horizontal lines spaced apart distances equal to the movement of the marker 41 under a variation of one thousand pounds of draft. The arcs 70 indicate the direction of movement of the marker. The dotted line 71 indicates the curves in the track, the curves being marked by the offset portions 72. The degree of curvature may be indicated by numerals opposite these offset portions 72 of the line 71. The vertical lines 73 are spaced apart distances representing one mile of track, the absolute distance between these lines depending upon the ratio between the speed of the train and the speed of the record sheet as determined by the actuating mechanism above described. The profile of the road is represented by the dotted line 74, and the percentage of grade by the figures opposite said line. The stations, or other landmarks, may be indicated by circles or other marks on the profile line.

Fig. 10 is a representation of a record sheet as used in a dynamometer of the kind herein described, the record made by the marker being indicated by the irregular line. Referring to the point 76 on the irregular line 75, it is observed that at this time a force of 61,500 pounds was being exerted, and that there was at this point in the road a curve of two degrees and a grade of .02%. The record sheet may, if desired, be graduated for steam pressure and by means of a recording steam gage the steam pressure also may be recorded thereon.

We claim:

1. In a locomotive dynamometer, pressure recording mechanism mounted on the locomotive, means for transmitting the draft of the locomotive to the train through pressure on a liquid, a pipe extending from said means to said pressure recording mechanism, a shunt in said pipe, a pump and a motor in said shunt, and gearing connecting said pump to one of the track wheels.

2. In a locomotive dynamometer, pressure recording mechanism and paper feeding mechanism mounted on the locomotive, means for transmitting the draft of the locomotive to the train through pressure on a liquid, a pipe extending from said means to said pressure recording mechanism, a shunt in said pipe, a pump and a motor in said shunt, gearing connecting said pump to one of the track wheels, and connections between said motor and said paper feeding mechanism.

3. In a locomotive dynamometer, pressure recording and paper feeding mechanism mounted on the locomotive, means for transmitting the draft of the locomotive to the train through pressure on a liquid, a pipe extending from said means to the pressure recording mechanism, a shunt in said pipe, a pump in said shunt, gearing between said pump and one of the track wheels, a motor in said shunt and mounted upon the locomotive, and a connection between said motor and said paper feeding mechanism.

4. In a locomotive dynamometer, pressure recording and paper feeding mechanism, means for transmitting the draft of the locomotive to the train through pressure on a liquid, and means for actuating the paper feeding mechanism by circulation of said liquid.

5. In a locomotive dynamometer, paper feeding mechanism, a pipe forming a closed circuit, a pump and a motor in circuit with said pipe and adapted to circulate and be actuated by the circulation of liquid therein, and connections between said motor and said paper feeding mechanism.

6. In a locomotive dynamometer, paper feeding mechanism, a pipe forming a closed circuit, a pump and a motor in circuit with said pipe and adapted to circulate and be actuated by the circulation of liquid therein, gearing between said pump and one of the track wheels, and connections between said motor and said paper feeding mechanism.

7. In a locomotive dynamometer, a pressure recording mechanism mounted on the locomotive, means for transmitting to said recording mechanism the draft of the locomotive upon the train, a pump mounted on the locomotive tender and geared to one of the track wheel axles thereof, a motor mounted upon the locomotive, a pipe forming a closed circuit between said pump and motor, and paper feed mechanism actuated by said motor.

8. In combination, a locomotive and train, a dynamometer interposed between said locomotive and train, a record sheet bearing upon a reduced scale the profile of the road to be traversed by the locomotive, paper feeding mechanism and a marker mounted on the locomotive, connections between said paper feeding mechanism and one of the track wheels to operate said mechanism at a rate proportional to the speed of the train, and connections between said dynamometer and marker to actuate the marker in accordance with the tractive pull of the locomotive.

SAMUEL THOMAS PARK.
JOHN EMMITT PHILLIPS.

Witnesses:
M. F. KEEGAN,
G. GRINER.